United States Patent
Pucel et al.

(10) Patent No.: US 7,343,794 B1
(45) Date of Patent: Mar. 18, 2008

(54) WEIR BOX AND SENSOR

(76) Inventors: Philip G. Pucel, 731 Custer St., Cheyenne, WY (US) 82009; Peter C. Allee, 2204 Rose Creek Dr., Gillette, WY (US) 82718

(*) Notice: Subject to any disclaimer, the term of this patent is extended or adjusted under 35 U.S.C. 154(b) by 0 days.

(21) Appl. No.: 11/716,861

(22) Filed: Mar. 12, 2007

Related U.S. Application Data (60) Provisional application No. 60/782,606, filed on Mar. 15, 2006.

(51) Int. Cl.
*G01F 1/20* (2006.01)
(52) U.S. Cl. ....................................... 73/215
(58) Field of Classification Search ................ 73/215, 73/40.5, 216, 300–302
See application file for complete search history.

(56) References Cited

U.S. PATENT DOCUMENTS

| | | | |
|---|---|---|---|
| 4,195,520 A | * | 4/1980 | Shaver .................. 73/215 |
| 4,571,997 A | * | 2/1986 | Kepple et al. ............. 73/215 |
| 4,608,181 A | * | 8/1986 | Hsiung et al. ............ 210/786 |
| 5,378,376 A | * | 1/1995 | Zenner ..................... 210/776 |
| 6,427,718 B1 | | 8/2002 | Stringam et al. |

OTHER PUBLICATIONS

Brian Dawson, "Open Channel Flowmeters", Isco, Inc., #2038, 7-98 pp. 1-2.
U.S. Fish and Wildlife Service, "Water Measurement" pp. 1-5, Web Site http://www.r6.fws.gov/wtr/water_measure.htm.

* cited by examiner

*Primary Examiner*—Jewel Thompson
(74) *Attorney, Agent, or Firm*—Roland H. Shubert (57) ABSTRACT

The flow rate of water passing into a weir box and over a weir that is mounted on the weir box is determined using a sensor to continuously or intermittently obtain a measure of the water level within the weir box relative to the bottom of the weir notch to thereby determine the head of the water flowing over the weir which, in turn, translates into flow rate. The sensor is located in the interior of the sump which is in fluid communication with water within the weir box. The sump is positioned deeply enough within the ground so that the sensor is below the frost line and is not damaged upon freezing of the water within the weir box.

27 Claims, 11 Drawing Sheets

WEIR BOX AND SENSOR

REFERENCE TO RELATED APPLICATION

This application claims the benefit of U.S. Provisional Patent Application No. 60/782,606 that was filed on Mar. 15, 2006.

BACKGROUND OF THE INVENTION

1. Field of the Invention

This invention relates generally to means and techniques for measuring the flow rate of a water stream in an open channel.

More particularly, this invention is directed to a weir box and weir, a water level sensor and associated structures to measure the rate of, and to document the volume of, water flow.

A specific embodiment of this invention is directed to the measurement of water flow that exits a pressurized pipe, enters a containment means such as a weir box, and then flows over a weir at atmospheric pressure.

2. Description of Related Art

A number of standard techniques and devices have been developed and are in use for the measurement of water flow rates within an open channel. Those include weirs, Parshall flumes, current meter gauging stations and the like. Almost anything that partially restricts flow in a ditch or channel can be used as a measuring device if it is calibrated. A calibrated restriction for measuring water flow may be broadly classified as either a flume or a weir. A flume comprises a structure that defines a specially shaped flow section that either provides a restriction in channel area or a change in channel slope, or both. Flow rate is determined by measuring the water depth at a specified location within the flume.

Probably the most common flow measurement method, and the method to which this invention is directed, employs a weir which is a calibrated restriction that controls the shape and velocity of the water flow passing the restriction. The flow rate is then determined by measuring the vertical distance from the apex or vertex of the overflow portion of the weir to the water surface near, but upstream from, the restriction. Calibration procedures are then used to develop equations or mathematical relationships that covert the water surface measurement to a flow rate. Flow volume is determined by integrating the flow rate over time.

There is an increasing need for the monitoring of flow rates and flow volumes from a variety of industrial, agricultural, and extractive activities. Those activities include the monitoring of industrial waste water outfalls, the rate and volume usage of irrigation water, and the dumping of by-product water from mining activities and from oil and natural gas production. A need for monitoring water flows is particularly acute in the production of coal bed methane as the coal beds are also aquifers, and much water is produced in the recovery of the natural gas.

Another factor that complicates the routine monitoring of water flows is that many of the metering locations are widely dispersed and remote and are subject to weather extremes, particularly extremely cold weather that often causes freezing of the water in the monitoring structure. In most instances, the height of the water surface relative to a weir reference point is determined through use of a pressure transducer that is placed at a fixed location relative to the weir reference point. Transducer pressure readings are thus translated directly into water levels. Freezing of the water in which a transducer is placed will destroy the transducer, and transducers that are accurate and stable enough for use are quite expensive.

The invention described in this application provides a new and practical way to monitor water flows, especially those flows that make a transition from pressurized pipe flow to atmospheric pressure in a weir box or other containment means, using a weir structure and a pressure transducer while at the same time avoiding damage to the transducer from freezing.

SUMMARY OF THE INVENTION

A system for monitoring and recording a water flow employs a weir box or dam structure to impound water and to cause it to flow through the notch, or opening, of a thin-walled, corrosion resistant weir plate. The water head, which is the difference in height between the lowermost point, or apex, of the weir plate and the level of the pooled water upstream from the weir plate, is determined using a water level sensor which may be a pressure transducer or probe that is placed within a sump and stilling well that is deep enough to site the probe below the frost line. The water head is then converted to flow rate using known mathematical relationships. The construction and placement of the sump and stilling well protects the probe from sediments settling from an inflowing water stream, dampens a choppy or turbulent water surface, and protects the water surrounding the probe from freezing that would damage or destroy the probe. A baffle system within the weir box functions to dissipate the energy of an incoming water stream and prevent erratic water level fluctuations around the probe.

DESCRIPTION OF PREFERRED EMBODIMENTS OF THE INVENTION

Figure 1:
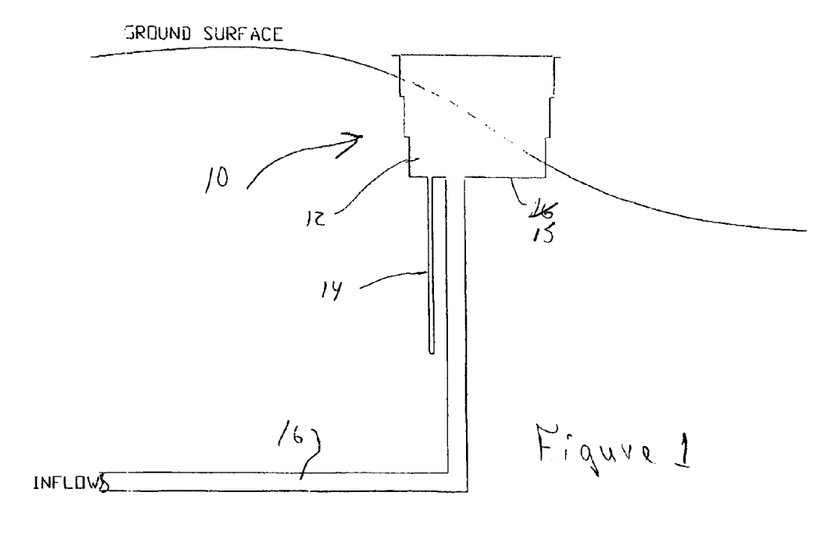
FIG. 1 is a side elevational view of as weir box, inflow line and probe sump according to one embodiment of this invention.

Various embodiments of this invention will be described in relation to the drawing in which FIG. 1 depicts at 10 the weir box and flow monitoring system in outline elevational view. The system includes a weir box structure 12 that is typical of those embodiments of this invention that are useful in the monitoring of water flows from a coal bed methane well such as those in the Powder River Basin of northeast Wyoming. In that industry, water pumped from wells is directed to an outfall and is discharged into a drainage. There is a regulatory requirement that the flow rate be monitored, and it has been typical practice for operators to construct lined basins with a steel plate dam having a V-notch weir to measure flow rate of the discharged water. Those systems have a number of disadvantages in that they do not conform to standard methods, are susceptible to deformation of the V-notch caused by corrosion of the steel plate, are expensive and prone to leakage, are difficult to repair; are often much larger than is needed, and ordinarily do not provide freeze protection for the sensor or probe used to measure the water level if water flow is interrupted during cold weather.

The weir box system of this invention provides flow rate measurements that conform to standard methods and provides dependable freeze protection for the pressure transducer that is used to determine head. Head is the difference in elevation between the weir apex (the bottom of the V-notch) and the pooled water surface upstream from the weir. It is the value that is correlated with flow rate. Construction and material costs are also reduced as compared to prior practices, and the problems caused by liner leaks and berm sloughing are eliminated.

Weir box 12 may have, in plan view, an elongated shape such as an elongated oval, and the upper box side must also have a vertical, relatively flat area to accommodate mounting of the weir plate. It is also preferred that the weir box sides be outwardly stepped or sloped, the cross section of the box enlarging as height increases, as that configuration is less likely to experience damage during freeze-thaw cycles. Volume of the weir box may suitably range from about 50 to 500 gallons depending upon the water flow rates anticipated. A probe sump and stilling well 14 extends downwardly below the box bottom 15, and is in hydraulic communication with the box interior. The box is preferably installed with its bottom level and resting on or adjacent to the ground surface at the siting location. A box drain plug 17 (FIG. 8) may be provided on the downstream end of the box.

Figure 2:
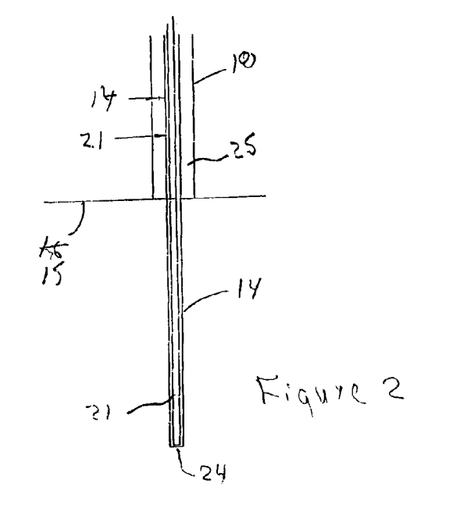
FIG. 2 is a vertical cross-sectional representation of a stilling well and probe sump structure for use with the embodiment of FIG. 1.
Figure 3:
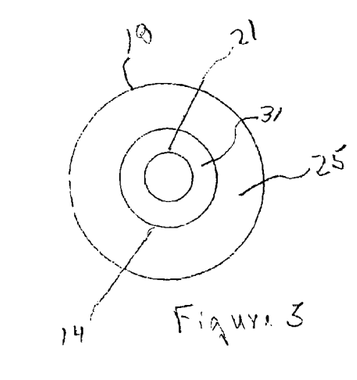
FIG. 3 is a horizontal cross-sectional view of the stilling well and probe sump of FIG. 2.
Figure 7:
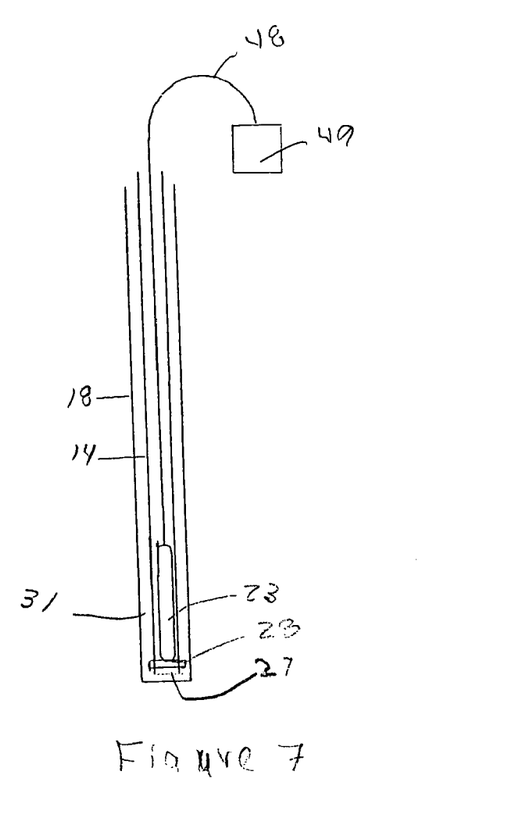
FIG. 7 is a cross-sectional view of a stilling well and probe sump with the probe in place.

FIGS. 2, 3 and 7 illustrate the structure of the sump and stilling well in more detail. As shown in those Figures, the sump and stilling well include a minimum of two, and advantageously three, lengths of pipe or tubing of decreasing diameter axially aligned one within the other in the manner shown in the FIG. 3 cross-sectional view. In the embodiment illustrated in FIGS. 1, 2 and 3, a probe sump extends below the box bottom 15 through a water-tight, bulkhead seal in the box bottom. A stilling well is formed by means of a pipe 18 that has an internal diameter larger than the external diameter of the sump 14, and extends upwardly from the box bottom to a point above the water level in the weir box. A center pipe 21 is sized so that it will fit within the sump pipe 14 and will allow a water level sensor, suitably a pressure transducer probe 23 (FIG. 7) to be axially inserted therein. All three pipes 14, 18, and 21, are perforated at multiple locations, the lowest of which is placed a distance, typically at least about six inches, above the box bottom and the highest of which is below the apex of the weir notch. The perforations may conveniently comprise drilled holes that are ¼ inch or so in diameter to allow hydraulic communication between the interior of the weir box and the interior of the central pipe 21 holding the transducer probe. That arrangement allows hydraulic communication among the annulus areas between the pipes to thereby provide a stilling action which dampens the turbulence of the water within the probe sump allowing the probe to accurately determine the elevation of the water surface. It also allows convenient removal of the probe for servicing or repair, or when sediments collecting around the probe interfere with its operation.

Bottom end 24 of sump 14 is closed as is the bottom end of annular space 25. In addition to performing a stilling function, the axially aligned pipes making up the sump also provide settling areas for sediments carried in the waste water, an important function as sediments in contact with the transducer probe 23 can affect its performance. A first sediment settling zone is formed by the box area external to pipe 18, and a secondary sediment settling zone comprises the annular space 25 which also serves as a repository for those sediments. A final sediment settling zone is provided in the annular space 31 that is formed between sump pipe 14 and center pipe 21, with a sediment accumulation area at the closed bottom of pipe 14. The bottom end 27 of central pipe 21 may be left open but a probe stop, 28, which may be a screw or pin extending across the pipe, provides a fixed-location seat for the transducer probe 23.

Sump 14 must be of sufficient length to extend downwardly from the weir box bottom to a level that places the sensor probe 23 below the frost line for the geographic area of the weir box installation. For most locations within the contiguous United States a sump length sufficient to position the probe about three feet or so below the ground surface will suffice. The top of the probe sump extends above the surface of the water in the box, and is either directly open to the atmosphere or is arranged so that the sump interior is in direct pneumatic communication with the atmosphere.

Figure 4:
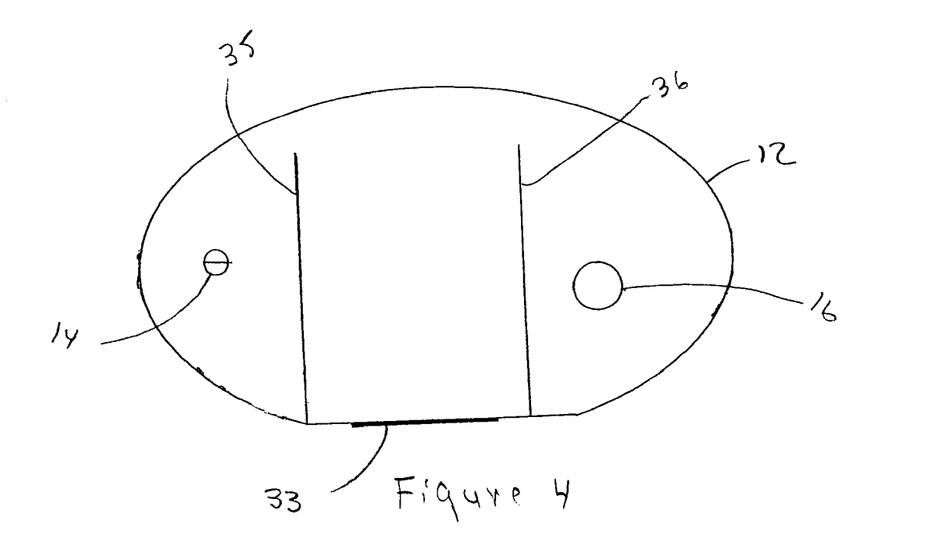
FIG. 4 is a top plan view of the weir box of FIG. 1.
Figure 5:
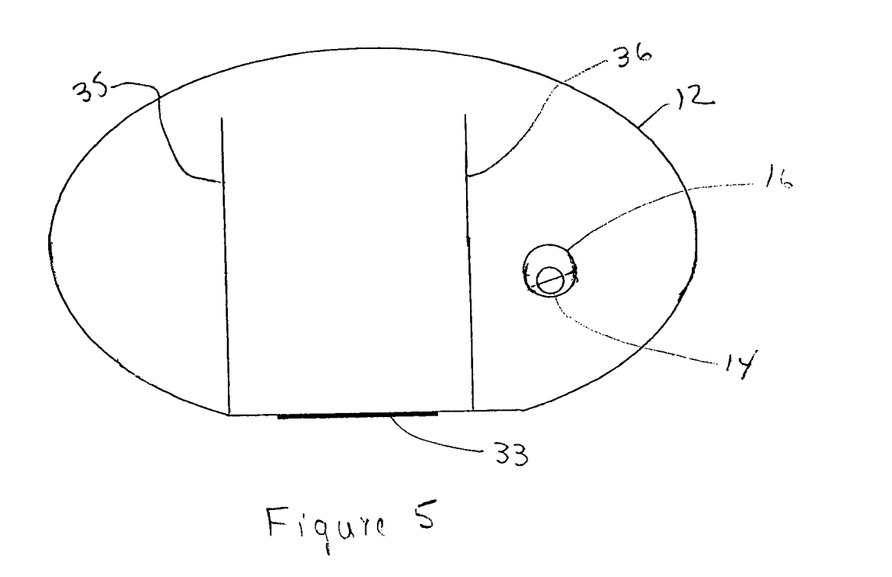
FIG. 5 is a top plan view of the weir box of FIG. 1 in which the stilling well is placed inside the inlet pipe.
Figure 6:
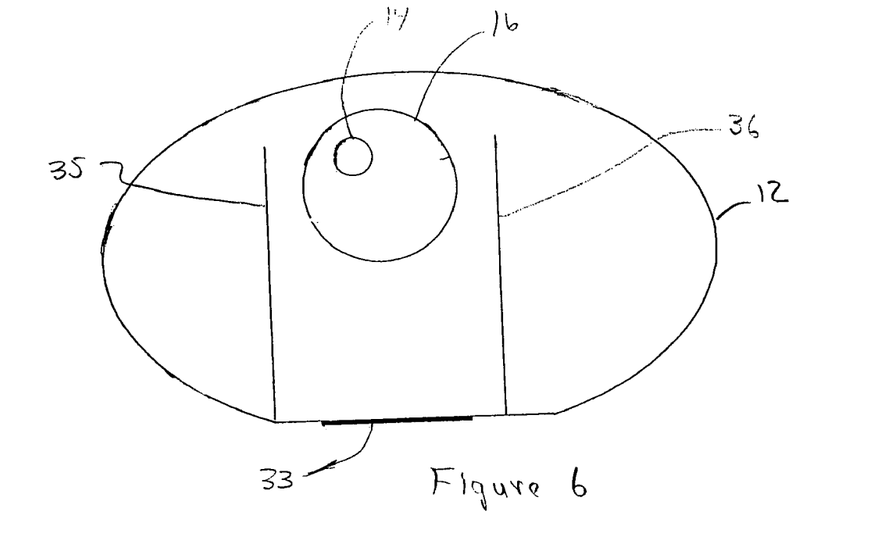
FIG. 6 is a top plan view of the weir box of FIG. 1 modified for high water flow rates, and in which the stilling well is placed inside the inlet pipe.
Figure 10:
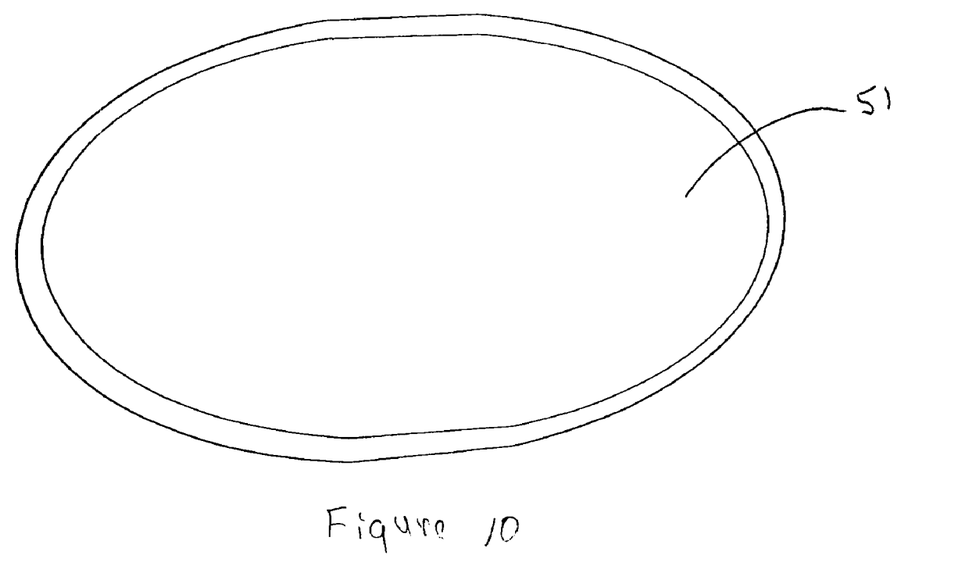
FIG. 10 depicts an optional cover for the weir box of FIG. 1.

FIGS. 4, 5 and 6 are all top plan views of the weir box 12 of FIG. 1, but illustrating different arrangements for the inflow pipe and sensor probe sump. In each of these Figures, the weir box 12 is depicted as having an elongated oval shape with a weir plate 33 located centrally along one box side. Baffle members 35 and 36 extend from the box bottom to a point above the surface of the water contained in the box. The baffle members serve to quiet surface turbulence caused by the inlet flow and by surface winds, allowing a more precise reading of the water surface level and resulting in a greater accuracy of the flow readings obtained. In some circumstances, it may be useful to provide a lid 51 (FIG. 10) for box 12 to shield it from excessive wind-caused turbulence and wind-blown debris that might compromise the accuracy of the flow rate measurements. As is depicted in the three Figures, the location of the inflow pipe 16 and the probe sump 14 may be at opposite ends of the weir box as shown in FIG. 4 or may be at other locations, preferably distant from the weir plate, as shown in FIGS. 5 and 6. In those circumstances where the inflow pipe 16 is of sufficient diameter and the first bend is deep enough, the sump and stilling well 14 may be placed within the inlet pipe coming into the weir box bottom as is illustrated in both FIGS. 5 and 6.

Figure 8:
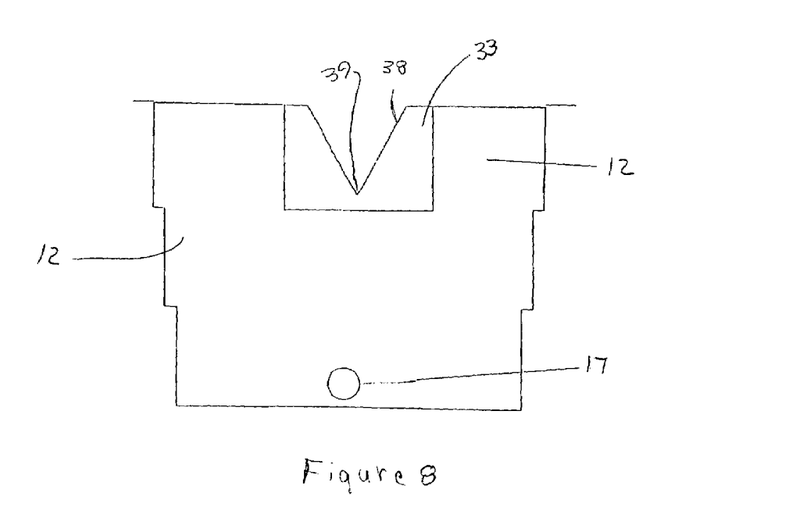
FIG. 8 is a front elevational view of the weir box of FIG. 1 illustrating a preferred style of weir notch.
Figure 9:
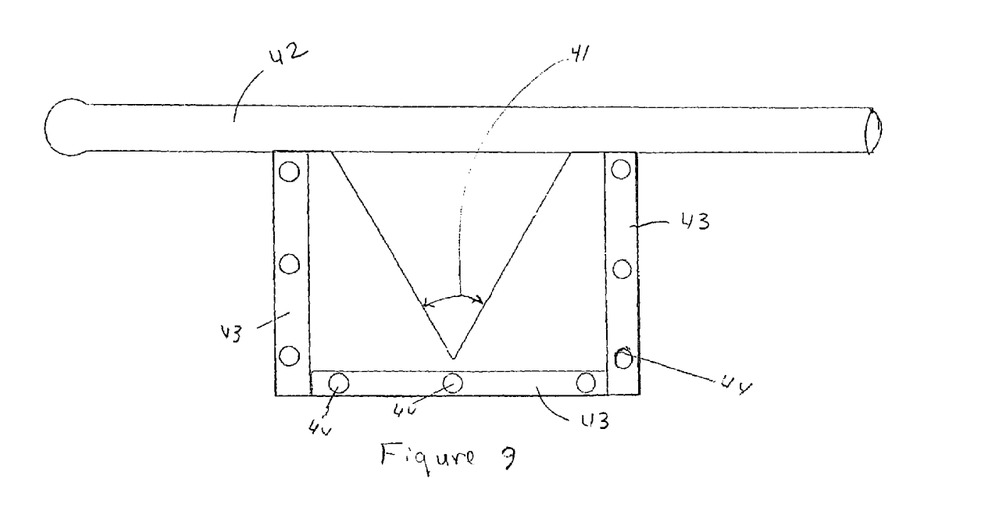
FIG. 9 is a front elevational view of the weir box of FIG. 1 illustrating a preferred method for mounting the weir plate to the weir box.

Details of the weir plate structure are shown in FIGS. 8 and 9. As is shown in FIG. 8, the weir plate 33 is mounted at or near the top of weir box 12. Plate 33 may be constructed from a thin sheet of corrosion resistant material, preferably stainless steel having a thickness on the order of ¹⁄₃₂ inch, so as to form a sharp-crested weir in which the water flowing through the weir springs clear. The weir plate may be mounted to the weir box 12 just below the box rim 42 sandwiched with a gasket (not shown) to prevent leakage and fixed in place using peripheral steel bands 43 and a plurality of bolt fasteners 44. A symmetrical weir notch 38 having an apex 39 is cut in the weir plate. Notch 38 is shown as being triangular in shape and that configuration is preferred. However, other notch shapes, typically rectangular or trapezoidal, may also be employed. The notch angle 41 is set depending upon the anticipated flow rate, and may range from about 20° for low flows to about 120° for higher flow rates.

After installation of the weir box at its designated location and the connection of the inflow line to the box, the weir plate is checked for level and plumbness as variations in those parameters can seriously affect the accuracy of the water flow measurements. Sensor probe 23 is calibrated at atmospheric pressure, then is lowered to the stop 28 of center pipe 21. A staff gage, which is a plate calibrated in incremental lengths and used to measure the head, is zeroed to the apex 39 of the weir notch. At the start of data collection, probe 23 is zeroed to the zero on the staff gage. Output from sensor probe 23 is transmitted via cable 48 to a data logger 49 (shown in FIG. 10) or other memory means that allow either continuous or intermittent downloading of collected data for further processing and archiving. Sensor output may be intermittent and periodic, once every 10 minutes for example, or may be continuous. Data processing may be limited to determining flow rate data or may include an integration step to obtain flow volumes as well as flow rates depending upon the needs and requirements of the installation.

Figure 11:
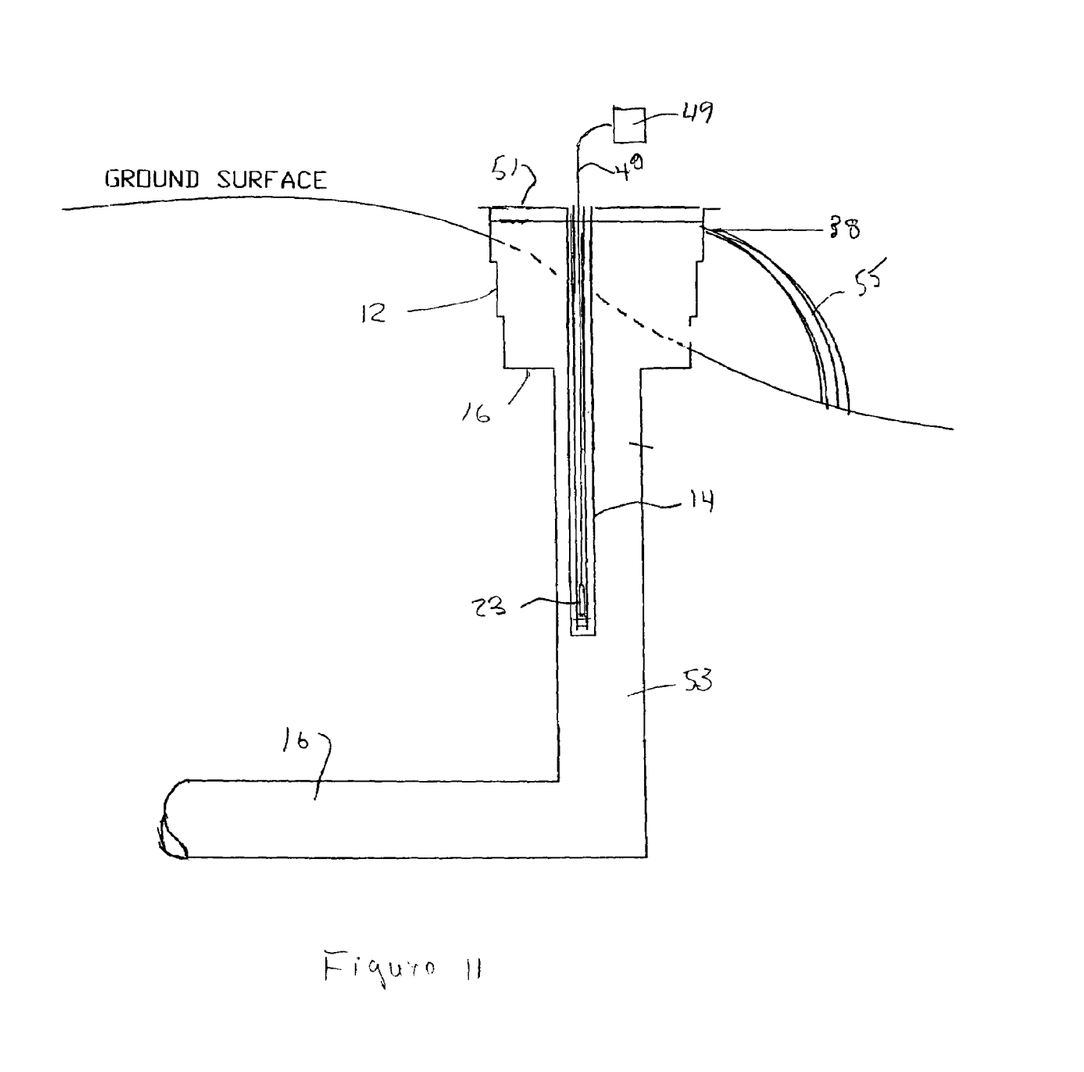
FIG. 11 is a side elevational view of the weir box of FIG. 1 adapted for use with high water flows.

FIG. 11 illustrates a side sectional view of a high flow volume installation of the weir box and sensor of this invention such as might be used for measuring the flow rate and volume of irrigation water. In this embodiment, the inflow line 16 is larger than is that one of FIG. 1 and includes a straight, vertical section 53 that extends a distance of at least about three feet below the bottom 15 of weir box 12. A probe sump and stilling well 14 extends sufficiently far, on the order of three feet, into the vertical section 53 to avoid danger of freezing. The top of sump 14 extends above the pooled water surface in box 12 and the interior of the sump is in open communication with the atmosphere. The water stream or nappe 55 passing through the weir notch is then conveyed away from the weir box for use or disposal.

Figure 12:
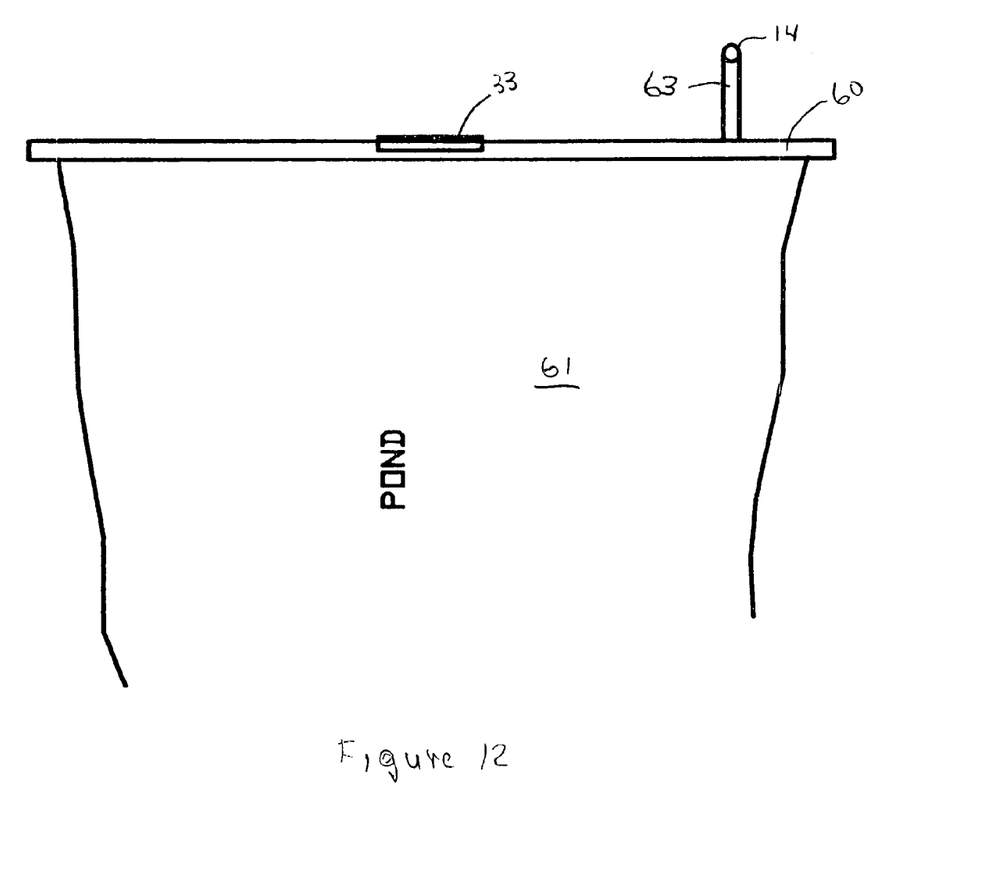
FIG. 12 is a plan view of an external stilling well used with a steel plate dam and weir.
Figure 13:
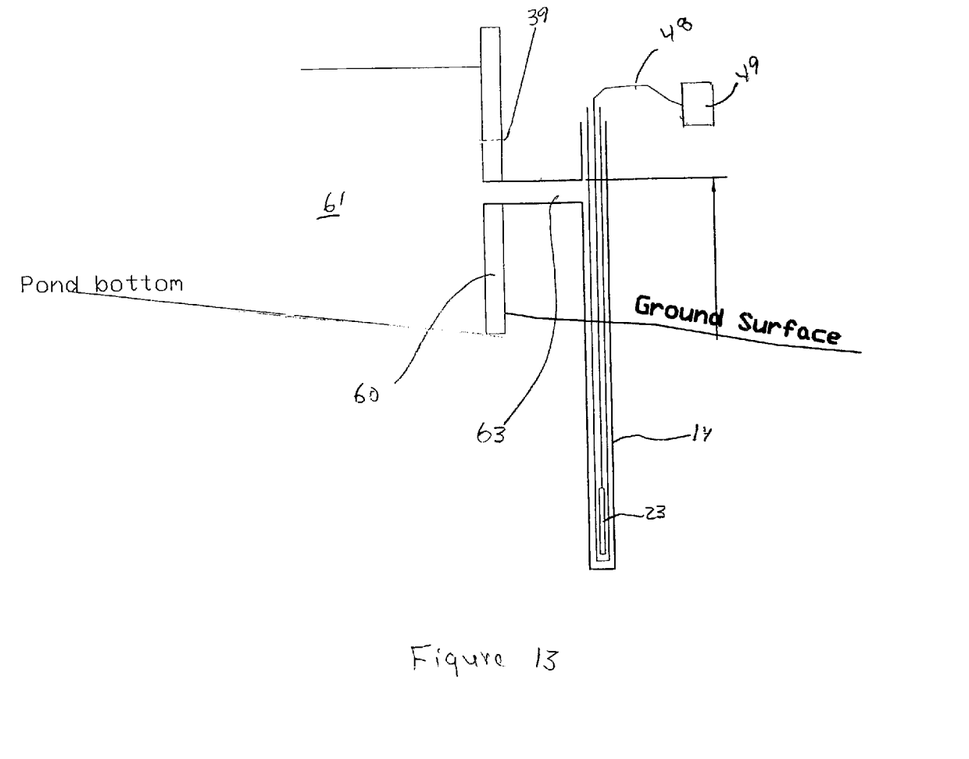
FIG. 13 is a side cross-sectional representation of the dam, weir and stilling well of FIG. 12.

Another embodiment of this invention is illustrated by FIGS. 12 and 13 in which an externally located sump and stilling well 14 is employed in association with a curtain wall dam such as the commonly used steel plate dam. FIG. 12 is a top plan view of a dam 60 and pond 61 while FIG. 13 presents a sectional view of that same illustration taken through the sump 14. Conduit means 63 provides an unobstructed hydraulic communication between the water in pond 61 and the interior of sump 14. Dam 60 includes a weir plate 33 having an apex 39 and is preferably constructed of a thin sheet of corrosion resistant material as was illustrated in FIGS. 8 and 9.

Figure 14:
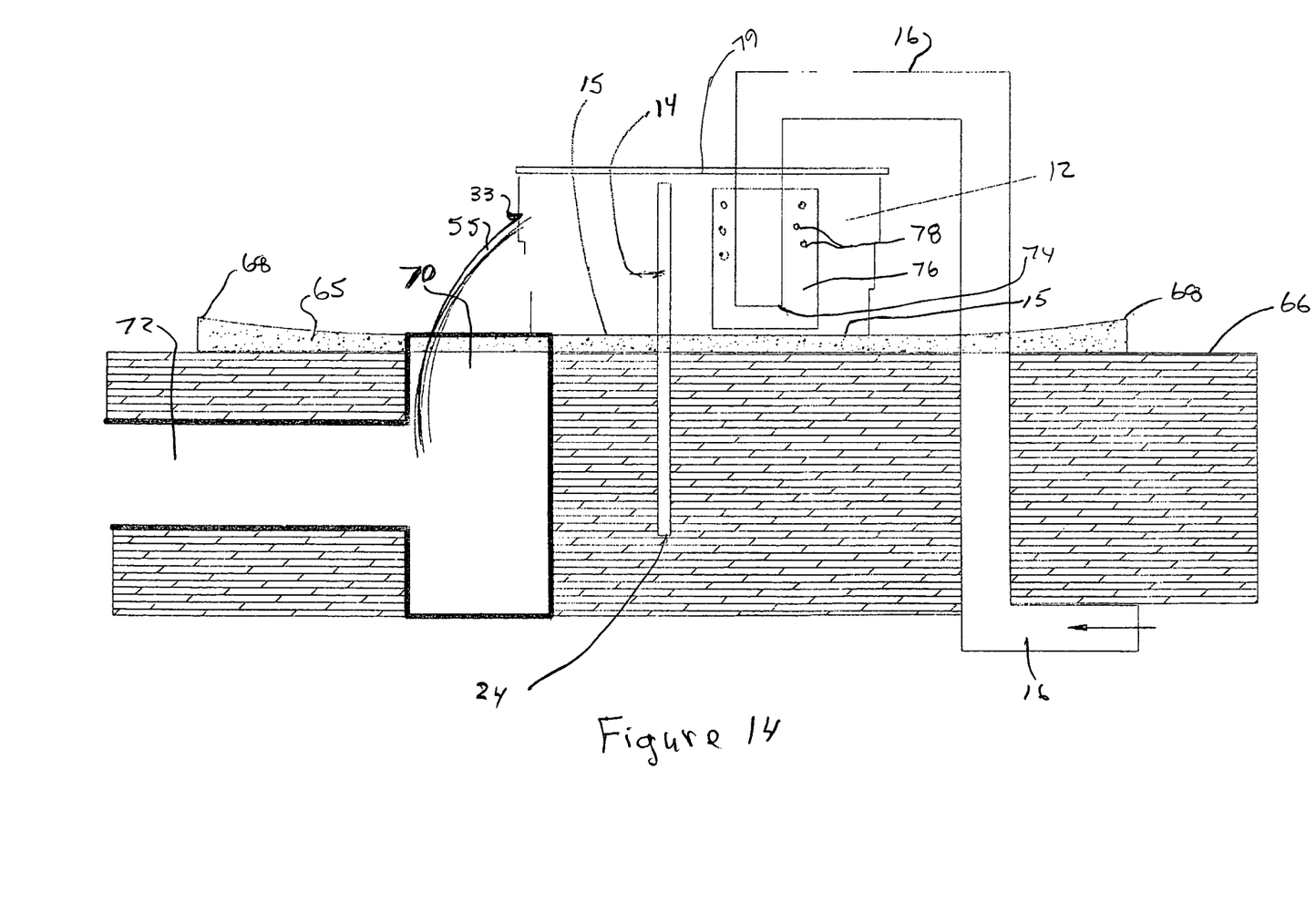
FIG. 14 is a profile sectional view of another embodiment of this invention showing the installation of a weir box, inflow line, probe sump and discharge line mounted upon a concrete pad.

FIG. 14 shows in profile view another embodiment in which weir box 12 is installed upon a concrete containment pad 65 that rests upon ground surface 66. Containment pad 65 is preferably formed with raised edges 68 so that blown or sprayed water that comes through the weir notch or that splashes over the side of the weir box is captured and channeled to the catch basin 70. Water then leaves catch basin 70 by way of discharge line, or sewer, 72 for further treatment or disposal. In this embodiment, inflow pipe 16 enters weir box 12 from the top, with the open end 74 of pipe 16 terminating at a generally central location within the weir box and at a point close to the weir box bottom 15. A turbulence reducing baffle 76 extends between inlet pipe 16 and probe sump 14 to smooth out fluctuations in water level within the weir box, to thereby obtain a more accurate measurement of the true water level within the weir box. Baffle 76 may conveniently comprise a pipe of larger diameter, suitably about twice the diameter, of inlet pipe 16 surrounding the downwardly extending portion of pipe 16. A plurality of perforations 78, which may comprise drilled holes, allow fluid communication through the baffle. It is also advantageous in many instances to fit the weir box 12 with a lid 79 so as to prevent debris from entering the weir box and to avoid wind-caused turbulence of the water within the box. This embodiment is particularly well suited for those applications in which the release of gases that are dissolved and entrained in the water causes turbulence within the weir box.

Probe sump 14 is disposed vertically at a location spaced apart from inflow pipe 16 and extends through the weir box bottom 15 and the containment pad 65. The sump bottom 24 is placed at a point sufficiently below the ground surface 66 as to be below the frost line. That ensures that a probe bottomed in sump 14 will not freeze even if water flow through weir box 12 is interrupted for an extended period of time.

Figure 15:
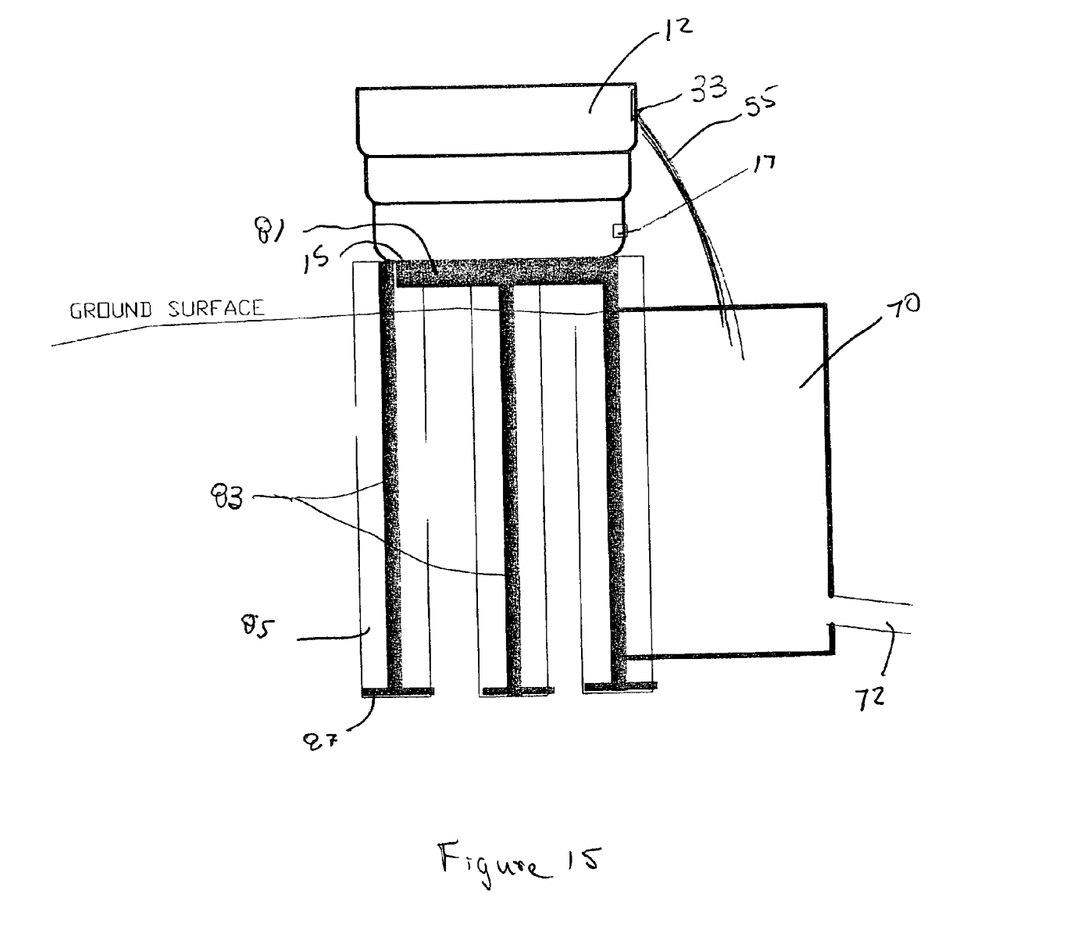
FIG. 15 is a side view of the weir box of this invention mounted upon a piling supported platform.

An alternative method for installing the weir box of this invention, well suited for use in soft, boggy or swampy ground, is illustrated in FIG. 15. In this embodiment, weir box 12 is mounted upon a platform 81 which in turn is supported by a plurality of legs or pilings 83. The support pilings may be driven into place as is often done, but it has been found more convenient to drill a hole 85 to a depth well below the frost line and to then insert a piling 83 having a foot pad 87 at the lower end thereof into the drilled hole. The hole is then backfilled with tamped soil or with grout. Platform 81 is then fixed atop the pilings and then the weir box 12 is mounted on the platform and positioned such that the box bottom 15 is level.

A weir plate 33 is disposed at one end of weir box 12 and is positioned over catch basin 70 so that the water stream or nappe 55 flowing through the weir notch falls into the catch basin. A discharge line 72 is provided adjacent the bottom of the catch basin to transport water to a treatment or disposal location. A box drain plug 17 may also be provided on the weir box wall below the weir plate so that drained water flows into the catch basin.

Figure 16:
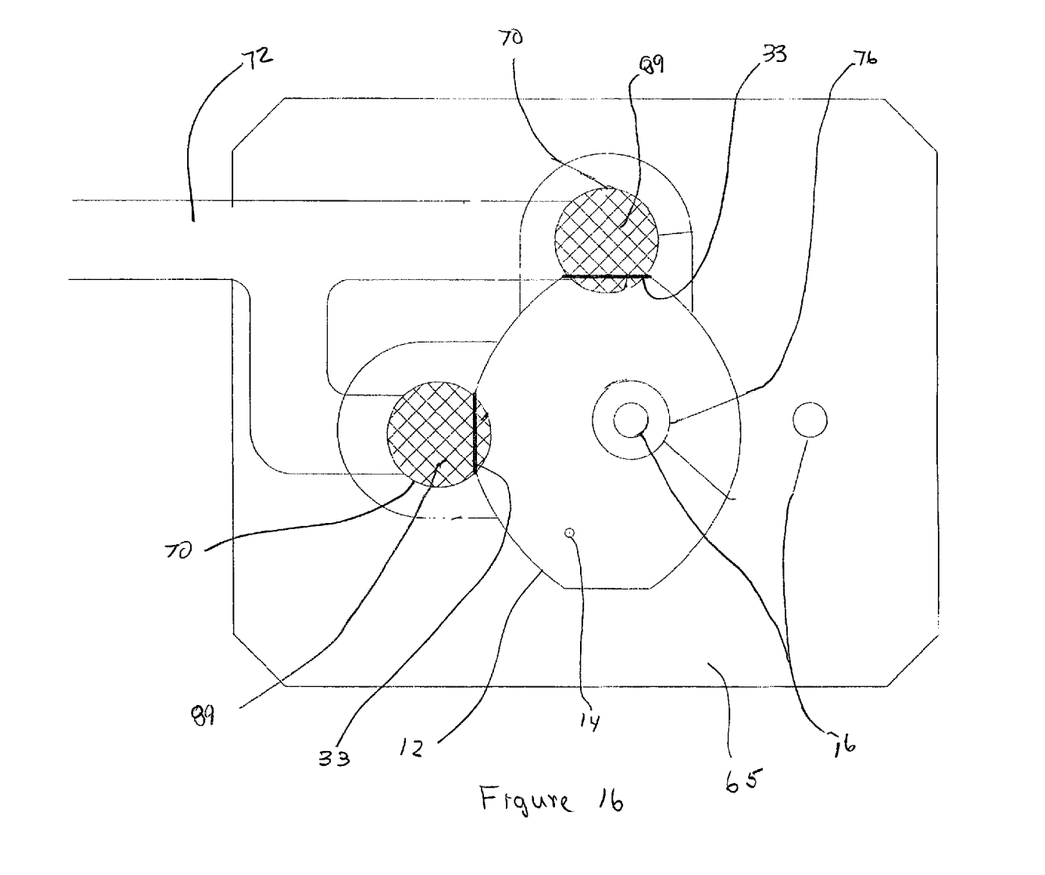
FIG. 16 is a plan, sectional view of a weir box of this invention employing multiple weirs.

It is also possible to increase the water flow that can be handled by a weir box of defined size by providing one or more additional weir plates, and that embodiment is shown in the plan view of FIG. 16. Turning now to that Figure, weir box 12 is shown supported on a containment pad 65 in the manner of FIG. 14. As with the embodiment of FIG. 14, inflow pipe 16 rises upwardly through the pad 65, makes a U-bend (shown in FIG. 14) and terminates at a generally central location above the box bottom 15. A turbulence-reducing baffle 76 is placed around the downwardly extending section of inflow pipe 16, and a probe sump 14 is located at a place remote from inflow line 16 and remote as well from weir plates 33. A catch basin 70, optionally fitted at the top with a grate 89, is disposed below each weir plate to drain water passing over the weir. Each catch basin is drained by discharge line 72 which carries the water to a place of treatment or disposal. A semi-hemispherical wind screen 91, may surround the catch basin and grate to keep wind-blown spray to a minimum and to reduce surface turbulence of the water within the weir box.

The invention has been described through reference to a number of specific and different embodiments thereof, and other variations and changes will be evident to those versed in the technology to which this invention pertains.

The invention claimed is:

1. Means for measuring the flow of a water stream comprising:
   a water containment means having at least one generally vertical side member, said containment means adapted to receive a flow of water from an external source and to discharge water from the containment means;
   a weir plate mounted vertically on said side member, said weir plate having a symmetrical notch therethrough for discharge of water from the containment means;
   a sensor means arranged to measure the water level within said containment means relative to the bottom of said notch; and
   means to prevent damage to said water level sensor upon freezing of the water in the containment means.

2. The means of claim 1 wherein said sensor damage prevention means comprises a sump that is adapted to receive said sensor, said sump extending into the ground to a point that is below the frost line, and having liquid communication means between said sump and the containment means.

3. The means of claim 2 wherein said sump comprises a first vertical pipe having a closed bottom end and a second pipe having an exterior diameter smaller than the interior diameter of said first pipe disposed axially within said first pipe, the interior diameter of said second pipe sized to accommodate said sensor means, said second pipe having a fixed location seat for said sensor and means allowing fluid communication between the interior of said second pipe and the annular space between said first and second pipes.

4. The means of claim 3 wherein said sump is located at a site external to said water containment means.

5. The means of claim 2 wherein said water containment means comprises a weir box having a generally flat bottom and wherein said box is installed at a measuring site with said box bottom resting on or adjacent to the surface of the ground.

6. The means of claim 5 wherein said sump extends below the weir box bottom through a water-tight seal.

7. The means of claim 6 wherein said sump extends upwardly to a point above the level of water in said weir box.

8. The means of claim 7 including a third pipe having an internal diameter that is greater than the external diameter of said first pipe, said first and third pipes in axial alignment to provide an annular space therebetween, and means allowing fluid communication between water contained in said weir box, said annular space and said sump, said annular space providing a settling area for sediments carried in the water and said fluid communication means serving to dampen turbulence within said sump.

9. The means of claim 6 including an inflow pipe containing said received water flow, said inflow pipe entering said weir box through the bottom thereof at a location spaced apart from said sump.

10. The means of claim 5 including an inflow pipe containing said received water flow, said inflow pipe entering said weir box through the bottom thereof, said sump extending downwardly into the inflow pipe.

11. The means of claim 5 wherein said weir box is installed upon a containment pad that in turn rests upon the surface of the ground.

12. The means of claim 11 including an inflow pipe containing said received water flow, said inflow pipe entering the weir box from the top thereof, said inflow pipe terminating adjacent the weir box bottom.

13. The means of claim 12 including baffle means disposed around the terminal end of said inflow pipe, said baffle means arranged to reduce turbulence caused by the flow of water from said pipe.

14. The means of claim 11 wherein said containment pad comprises a concrete slab having raised edges and wherein a catch basin is disposed below said weir plate, said catch basin arranged to drain water that is discharged through said weir plate.

15. The means of claim 5 wherein said weir box is installed upon a platform that in turn is supported by a plurality of leg members extending into the ground.

16. The means of claim 5 wherein an upper side of said weir box is flat and vertical and wherein said weir plate is mounted at, or adjacent to, the weir box top on said upper, flat, vertical box side, and wherein the notch in said weir plate is triangular in shape.

17. The means of claim 16 wherein the apex angle of said triangular notch is between about 20° and about 120°.

18. The means of claim 5 wherein a plurality of weir plates are mounted on said weir box.

19. A method for preventing cold weather damage to a water level sensor while measuring the flow of a water stream using that level sensor, comprising:
   causing said water stream to flow into a containment means;
   discharging water from said containment means through a symmetrical notch in a weir plate that is disposed on a side of the containment means;
   providing a sump that is adapted to receive and hold said sensor;
   establishing liquid communication between water in said containment means and said sump;
   using said sensor to determine the level of the water within the containment means relative to the bottom of said notch to thereby determine the head of water flowing through said notch;
   converting said water head to flow rate; and
   positioning said sump deeply enough within the ground so that the sensor is below the frost line thereby protecting the sensor from damage upon freezing of the water in the containment means.

20. The method of claim 19 wherein said containment means is a weir box and wherein said sump comprises a first vertical pipe having a closed bottom end and a second pipe having an exterior diameter smaller than the interior diameter of said first pipe disposed axially within said first pipe, the interior diameter of said second pipe sized to accommodate said sensor means, said second pipe having a fixed location seat for said sensor and means allowing fluid communication between the interior of said second pipe and the annular space between said first and second pipes.

21. The method of claim 20 wherein said sump is located external to said weir box.

22. The method of claim 20 wherein said weir box has a generally flat bottom and is installed at a measuring site with said box bottom resting on or adjacent to the surface of the ground and wherein said sump extends downwardly below the weir box bottom through a water-tight seal.

23. Means for measuring the rate of flow of a water stream comprising:
- a weir box having a generally flat bottom and at least one substantially vertical side;
- a weir plate having a symmetrical notch therethrough mounted on the vertical box side at or adjacent to the weir box top, said weir plate and notch arranged to allow water flow out of said weir box through said notch;
- means to introduce the water stream into said weir box;
- sensor means arranged to measure the water level within said box relative to the bottom of said notch to thereby determine the head of the water that is flowing through the notch; and
- sump means adapted to hold said sensor, said sump means arranged to be in liquid communication with the box interior, said sump means extending into the earth to a point whereat the sensor is below the frost line.

24. The means of claim 23 wherein said weir box is installed at a measuring site with the box bottom resting on or adjacent to the surface of the ground and wherein said sump is disposed vertically to extend below the weir box bottom through a water-tight seal and to extend upwardly to a point above the level of water in said weir box.

25. The means of claim 23 wherein said sump is installed at a location external to the weir box.

26. The means of claim 23 wherein said sump comprises a first vertical pipe having a closed bottom end and a second pipe having an exterior diameter smaller than the interior diameter of said first pipe disposed axially within said first pipe, the interior diameter of said second pipe sized to accommodate said sensor means, said second pipe having a fixed location seat for said sensor and means allowing fluid communication between the interior of said second pipe and the annular space between said first and second pipes.

27. The means of claim 23 wherein the notch in said weir is triangular in shape and wherein the apex angle of said triangular notch is between about 20° and about 120°.

* * * * *